March 25, 1930.   R. UHLIG   1,751,898
DEVICE FOR WEIGHING MATERIAL DURING ITS MOTION THROUGH A CONVEYER
Filed July 15, 1927

Patented Mar. 25, 1930

1,751,898

UNITED STATES PATENT OFFICE

RICHARD UHLIG, OF BETHLEHEM, PENNSYLVANIA

DEVICE FOR WEIGHING MATERIAL DURING ITS MOTION THROUGH A CONVEYER

Application filed July 15, 1927, Serial No. 206,104, and in Germany December 19, 1925.

This invention relates to a device for weighing material, especially granular material, during its motion through a conveyer which is provided with a travelling belt serving for supplying the material to the weighing device proper as well as for discharging it therefrom, and consists essentially therein, that the weighing device and the reversing rollers of said belt are arranged displaceably in the direction of travel of the belt, in order to be able to adjust at will the position of the places where the weighing of the material and its discharge from the weighing devices takes place.

A further feature of my invention consists therein, that the weighing device and the reversing rollers for the travelling belt are mounted upon a common travelling frame and that said frame is constructed as a carriage for discharging the material from the conveyer.

There are devices known for the weighing of granular material or the like during its being conveyed by a conveyer, said devices employing one and the same travelling belt for supplying said material to and discharging it from the weighing device, in such a manner that the material is carried below an automatic balance or the like and around the same by mans of reversing rollers. According to my invention the weighing and eventually also the discharging of the material may be accomplished at different points of the travelling belt, for instance by mounting the weighing device and the reversing rollers for the travelling belt upon a common travelling frame, said travelling frame being at the same time constructed to serve as a discharge carriage, which may be positively moved in forward and backward direction.

The material therefore may either be discharged onto the continuously travelling belt or into a storage room which may be provided in form of pockets or the like. The indicating device of the weighing device is preferably provided with means for automatically recording the indication.

Figure 1:
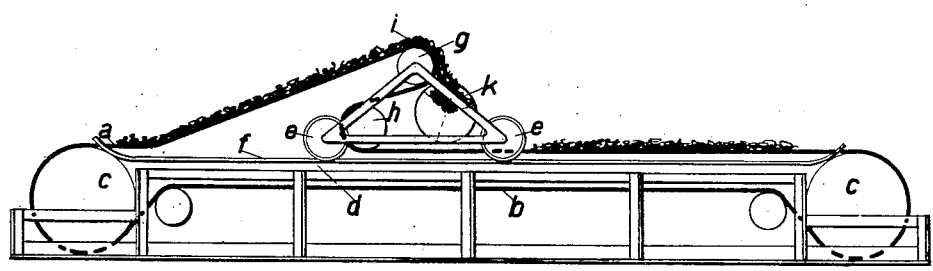
Figure 3:
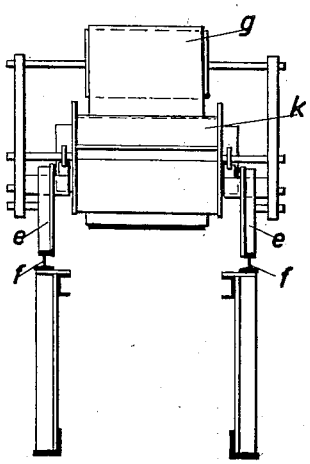
Figure 2:
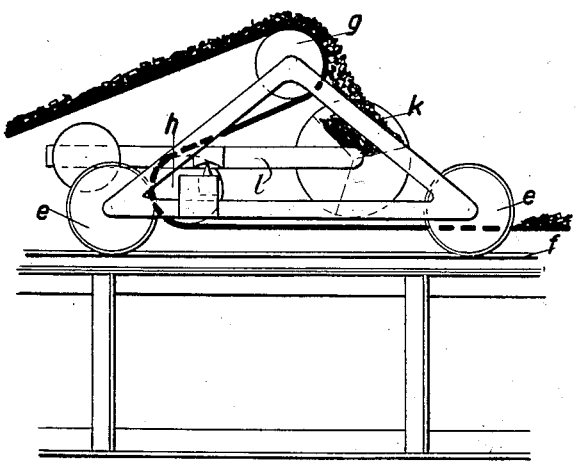

In the accompanying drawings I have shown an example of the weighing device according to my present invention, Fig. 1 being a side-view, with parts omitted, of my new weighing device wherein the weighing device proper is moved by hand, while the material is discharged from the weighing device by means of a container which may for instance consist of a bucket drum onto the continuously travelling belt of the conveyer. Fig. 2 shows only the weighing device proper on a larger scale together with the associated parts in a longitudinal lateral view, while Fig. 3 is a view of the device shown in Fig. 2 perpendicular to the view shown in Fig. 2. The same reference characters indicate the same devices in the several figures of the drawings.

The travelling belt consists of an upper part $a$ and an under part $b$. The belt is laid around the driving and guilding rollers $c$ and so guided by means of the two rollers $i$ and $h$ that the material will be thrown off at an intermediate place as indicated at $g$. The two guiding rollers $i$ and $h$ are mounted upon a travelling frame, which may be moved by means of the wheels $e$ upon the rails $f$, said frame serving likewise for supporting the container $k$ of the weighing device which may be made in the form of a bucket drum on the weighing lever.

I claim:

1. A device for weighing material during its motion through a conveyer, comprising a weighing device, a travelling belt mounted on reversing rollers and adapted to serve for the supply of said material to said device as well as for the discharge of said material therefrom, means for mounting said weighing device and said reversing rollers displaceably in the direction of travel of said belt for the purpose of changing at will the place of weighing of said material as well as the place of discharging the same from said device.

2. A device, as specified by claim 1, having the weighing device proper and the reversing rollers commonly mounted upon a travelling frame.

3. A device, as specified by claim 1, having the weighing device proper and the reversing rollers commonly mounted upon a travelling frame, said travelling frame being adapted to serve as a discharge carriage for said material.

RICHARD UHLIG.